United States Patent
Sartori et al.

(10) Patent No.: US 7,119,320 B2
(45) Date of Patent: Oct. 10, 2006

(54) PHOTO-SENSITIVE ELEMENT FOR ELECTRO-OPTICAL SENSORS OPERATING UNDER VARIOUS ILLUMINATION CONDITIONS

(75) Inventors: Alvise Sartori, Povo (IT); Monica Vatteroni, Trento (IT)

(73) Assignee: Neuricam SpA, Trento (IT)

( * ) Notice: Subject to any disclaimer, the term of this patent is extended or adjusted under 35 U.S.C. 154(b) by 102 days.

(21) Appl. No.: 10/804,136

(22) Filed: Mar. 19, 2004

(65) Prior Publication Data

US 2005/0103982 A1 May 19, 2005

(30) Foreign Application Priority Data

Nov. 17, 2003 (IT) .......................... UD2003A0226

(51) Int. Cl.
*G01J 1/44* (2006.01)
(52) U.S. Cl. ................................. 250/214 L
(58) Field of Classification Search ............. 250/214.1, 250/214 L, 208.1; 348/302, 308
See application file for complete search history.

(56) References Cited

U.S. PATENT DOCUMENTS

| 5,608,204 A | 3/1997 | Hofflinger et al. ........ 250/208.1 |
| 5,917,547 A | 6/1999 | Merrill et al. ............... 348/301 |
| 6,323,479 B1* | 11/2001 | Hynecek et al. ......... 250/214 L |
| RE38,499 E | 4/2004 | Merrill et al. ............... 348/301 |
| 6,731,397 B1* | 5/2004 | Merrill et al. ............... 358/1.16 |

FOREIGN PATENT DOCUMENTS

EP 1041818 10/2000
WO 0036821 6/2000

OTHER PUBLICATIONS

Tian H et al. "Analysis of Temporal Noise In Cmos Photodiode Active Pixel Sensor" IEEE Journal Of Solid-State Circuits, IEEE Inc. New York, US, vol. 36, No. 1, Jan. 2001, pp. 92-101, XP001061797 ISSN: 0018-9200.
Fox E C et al. "Wide-Dynamic-Range Pixel With Combined Linear And Logarithmic Response and Increased Signal Swing" Proceedings of the SPIE, vol. 3965, Jan. 24, 2000, pp. 4-10, XP001058221 San Jose, CA USA.
Ulrich Seger et al., "Vision Assistance in Scenes with Extreme Contrast", *IEEE Micro*, vol. 13, pp. 50-55 (Feb. 1993).
Tian H et al. "Analysis of Temporal Noise In Cmos Photodiode Active Pixel Sensor" IEEE Journal Of Solid-State Circuits, IEEE Inc. New York, US, vol. 36, No. 1, Jan. 2001, pp. 92-101, XP001061797 ISSN: 0018-9200.
Fox E C et al. "Wide-Dynamic-Range Pixel With Combined Linear And Logarithmic Response and Increased Signal Swing" Proceedings of the SPIE, vol. 3965, Jan. 24, 2000, pp. 4-10, XP001058221 San Jose, CA USA.

\* cited by examiner

*Primary Examiner*—Thanh X. Luu
(74) *Attorney, Agent, or Firm*—Stevens, Davis, Miller & Mosher, LLP

(57) ABSTRACT

A photo-sensitive element for electro-optical sensors, includes a photo-sensitive reception member, a current conversion circuit to convert the current generated by the photo-sensitive reception member into a voltage signal, and an amplification and reading circuit. The current conversion circuit includes a P-channel transistor used as an ideal key and piloted with a voltage that can vary between a high feed voltage and a low feed voltage. The photo-sensitive element is taken to a reset state if the pilot voltage of the transistor is low, and to an integration state if the pilot voltage is high.

14 Claims, 2 Drawing Sheets

PHOTO-SENSITIVE ELEMENT FOR ELECTRO-OPTICAL SENSORS OPERATING UNDER VARIOUS ILLUMINATION CONDITIONS

FIELD OF THE INVENTION

The present invention concerns a photo-sensitive element used in electro-optical sensors, suitable to detect an incident light and to convert it into a correlated electric signal.

The photo-sensitive element according to the present invention is used to make electro-optical sensors of a two-dimensional matrix or linear type, which can be used in various electronic devices for artificial vision, such as for example digital video cameras, smart optical sensors or otherwise.

The photo-sensitive element according to the invention guarantees a very satisfactory image quality both in conditions of low light and also in the presence of uncontrolled light, hence characterized by variable intensity over a wide interval, for example to make electro-optical sensors used in the field of automotive, in security controls, in road safety control and in traffic control.

BACKGROUND OF THE INVENTION

Optical sensors are known, consisting of a plurality of photo-sensitive elements, or pixels, able to detect light signals and to transmit them, in the form of electric signals, to a calculator which processes them and obtains images from them which it transmits to display devices; the latter are then able to allow a user to see such images or information deriving therefrom.

Previously, such optical sensors were made using CCD technology (Charge-Coupled Device), which guarantees a very satisfactory image quality in the presence of a well-controlled illumination, but are not able to operate optimally in the presence of a light which is greatly differentiated inside the same scene, that is, with an input signal having high dynamics, up to 150 dB.

CCDs are also not very versatile from various points of view: they cannot easily be integrated with complex pilot circuits in a single silicon support (called microchip), and it is not possible to arbitrarily select a sub-window inside the matrix sensor.

To overcome some of these shortcomings of CCDs, optical sensors have been developed based on the CMOS type silicon technology (Seger, Graf, Landgraf—"Vision Assistance in Scene with extreme Contrast"—IEEE Micro, vol. 13 page 50, February 1993), which offer a good result in very differentiated lighting conditions inside the same scene. This result is obtained by means of a conversion on logarithmic scale of the signal inside the photo-sensitive element or pixel.

Such logarithmic conversion, obtained for example by connecting an MOS type transistor in diode configuration to the photo-sensitive joint, as described in U.S. Pat. No. 5,608,204, suffers in any case from the fundamental disadvantage that it supplies a low definition of the image in the event of low illumination. High resolution images are obtained by means of a linear reading of the photo-sensitive element; this technique, however, has the disadvantage that it does not give the possibility of obtaining good quality images in very differentiated lighting conditions inside the same scene.

The Applicant has devised and embodied the present invention to overcome these shortcomings of the state of the art and to obtain further advantages.

SUMMARY OF THE INVENTION

The present invention is set forth and characterized essentially in the main claim, while the dependent claims describe other innovative characteristics of the invention.

The purpose of the invention is to achieve a photo-sensitive element for electro-optical sensors which can be integrated into a silicon support element, or substrate, of limited size, by achieving a microchip, which is suitable to supply good quality images at a high repetition frequency both when there is low light and also in the presence of an input signal characterized by high dynamics.

To be more exact, the purpose of the invention is to obtain an output signal deriving, in conditions of low illumination, from reading the linear output of the signal arriving from the photo-sensitive element and, in conditions of high illumination, from reading the logarithmic conversion in voltage of the current input signal. In both cases the input signal must be of a sufficiently high value to allow an efficient processing and good immunity with respect to the electric noises generated by the other components present on the microchip where the photo-sensitive element is installed.

In accordance with such purposes the photo-sensitive element according to the present invention consists of a photo-sensitive reception means, such as for example an inversely polarized diode, and a circuit consisting of at least a P-channel MOSFET type transistor, having one terminal (source/drain) connected to an external voltage and the other connected to the photo-sensitive reception means.

The P-channel transistor has the gate terminal connected to an external signal which allows the value of the voltage applied to be varied.

According to a preferred embodiment of the invention, the circuit comprises at least a P-channel transistor and at least an N-channel transistor, having the gate terminal connected to an external circuit which allows the value of the external voltage applied to be varied. Both the transistors have one of the two terminals (source/drain) connected to said external voltage and the other connected to the photo-sensitive reception means.

According to the invention, the P-channel transistor is used as an ideal switch, driven with a voltage variable between a high voltage and a low voltage; according to the gate voltage applied, the photo-sensitive element is taken to one of the two possible configurations: reset state if the applied voltage is low, integration state if the applied voltage is high.

At low light, the N-type transistor is switched off. When light increases over a threshold, it starts to work in linear region, as an active load, causing a logarithmic compression of the photo-detected signal.

In a preferential embodiment, the P-type transistor and the N-type transistor are of the CMOS type. Moreover, when the P-type transistor is used as an ideal switch, the N-channel transistor is able to represent an active load.

A number of N-type transistors variable from 1 to 12 can be used in order to increase by a corresponding value the logarithmic conversion gain of the current photo-generated by the photo-sensitive reception means.

In a preferential embodiment, the N-channel MOSFET type transistor is polarized by allocating a high voltage on the gate terminal during the reset period, and a variable voltage over the whole voltage range during the integration period. According to the value of the voltage applied during the integration period, it is possible to dynamically vary the duration of the zone of illumination in which the photo-sensitive element supplies a linear response, with respect to that in which it supplies a logarithmic response.

In another embodiment, the N-channel transistor is driven with a constant voltage having a value included in the allowed voltage range.

In another preferential embodiment, this structure is completed by an amplification and readout circuit made, for example with two more MOSFET transistors.

The configuration with two transistors, one P channel and one N channel, is characterized mainly by the following features:

it supplies a good image quality even in low light environments (photo-generated current);

it has the capacity to detect the light radiation in a wide range of intensity, even up to 150 dB;

it allows to make sensors whose photo-sensitive elements, arranged in linear or matrix structures, are accessible according to any sub-windowing decided by the user;

it allows to eliminate reading noise in hardware mode over the whole explorable range of illumination, both in the linear detection zone and in the logarithmic detection zone.

If the reset state, as in known implementations, were reached only by means of an N-channel transistor, after the subtraction of the signal detected in the reset state and the signal detected in the integration state, it would be possible to obtain a signal that could be exploited electrically when functioning in the linear zone, but not when functioning in the logarithmic zone. This is because the N-channel transistor, with gate and drain connected to the external voltage, does not behave like an ideal switch but like a diode, and therefore the value to which the photosensitive node is set during the reset state is not the external voltage, but a value that differs from this voltage depending logarithmically on the incident light. Consequently, after the subtraction of the signal detected in the reset state and the signal detected in the integration state, we have zero information.

Using a P-type transistor instead of an N-type transistor we have an ideal behavior, and hence the voltage that is set on the photosensitive node is the external reference voltage, irrespective of the intensity of the incident light. This guarantees both the possibility of obtaining, after the subtraction of the signal detected in reset and in integration conditions, a value that can be used also when operating in the logarithmic zone, and also the possibility of minimizing noise when operating in the linear zone.

Moreover, thanks to the good level of signal generated, we obtain a good level of the signal-noise ratio of the device, and consequently the optimum integration in silicon on a single microchip of the photo-sensitive element, together with devices that process the signal, in order to achieve small-size sensors and hence limited production costs, highly reliable and able to be used in different applications.

The functionality of the invention is based on the generation of a current directly proportional to the incident light on the photo-diode, which, being inversely polarized, has a large emptied zone wherein electron-hole couples are generated. This circuit configuration is particularly suitable to obtain a voltage signal in a very wide range, thanks to the fact that, in the reset phase, the P-channel transistor allows to polarize the photo-sensitive element at a voltage equal to the external voltage.

The presence of the N-channel transistor allows the photo-sensitive element to detect the light radiation in a wide range of light intensity, even up to 150 dB; this is achieved thanks to the possibility of making a logarithmic compression of the high-luminosity signals and the great precision with which the low-luminosity signals can also be detected.

When there is strong illumination, the passage from an off-region zone to a triode zone occurs naturally, thanks to the physical properties of the device.

Given the need to transfer the voltage signal to the read-out circuit, a third transistor is arranged to perform a first amplification, while a fourth transistor, which can be selectively enabled, allows to connect the photo-sensitive element to a signal transmission line, called bitline.

Two phases are provided for reading the signal, wherein two different signals are acquired, subsequently subtracted one from the other. In a preferential embodiment, there is a suitable device able to perform a subtraction and a first amplification. In the first of the two phases, called the integration phase, the information is extrapolated from the photo-sensitive element from which the signal obtained during the reset phase will be subtracted, this second signal represents the noise associated with the reading circuit. The reading of the signal can occur simply by enabling the fourth transistor of the pixel that is to be read and making the subtraction of these two signals. In this way we obtain the signal without the noise introduced by the reading circuit.

This type of pixel can also be used as a purely logarithmic pixel, by definitively fixing the gate of the P-channel transistor to an high voltage, and that of the N channel, to the external voltage. In this case, it will be possible to do a continuous reading of the pixel matrix without waiting for integration times before obtaining the output signal, but it will be necessary to give up the hardware correction of the noise, which correction will have to be carried out in any case outside the chip in order to obtain good level images.

BRIEF DESCRIPTION OF THE DRAWINGS

These and other characteristics of the present invention will be apparent from the following description of two preferential forms of embodiment, given as a non-restrictive example with reference to the attached FIGS. 1 and 2 which shows an electric diagram of a photo-sensitive element according to two alternative embodiments the present invention.

DETAILED DESCRIPTION OF A FORM OF PREFERENTIAL EMBODIMENT OF THE INVENTION

Figure 1:
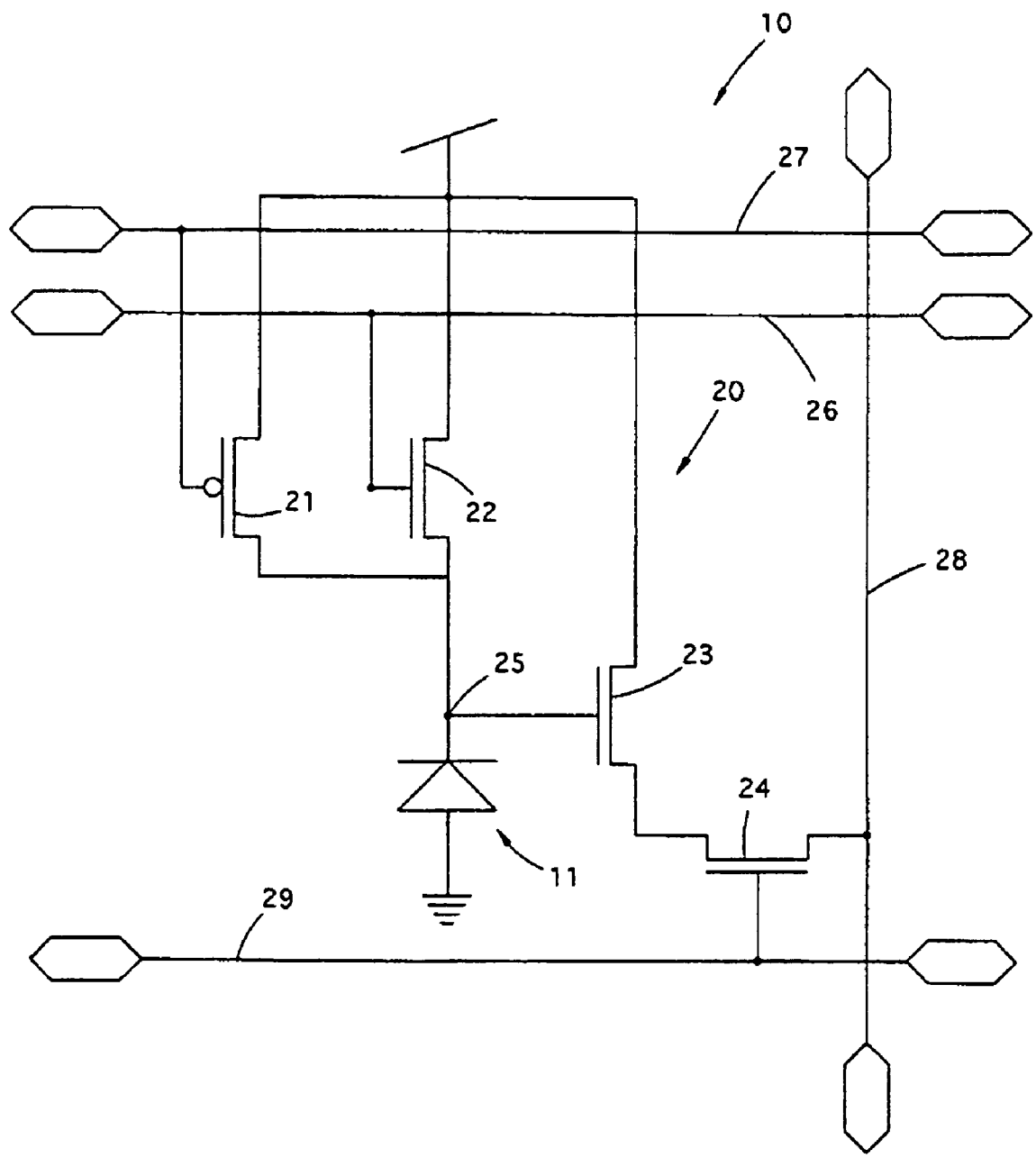

With reference to the attached drawings, and particularly to FIG. 1, a photo-sensitive element or pixel 10 according to the present invention consists of an inversely polarized diode 11 defining a photosensitive node 25, two transistors, respectively a first 21 of the P-channel type and a second 22, of the N-channel type, to polarize the photo-diode, and an amplification and reading circuit 20 comprising two transistors, respectively third 23 and fourth 24.

In the preferential embodiment, the first 21 and the second 22 transistors are of the CMOS type. When the first transistor 21 is of the P-channel type, it is able to represent an ideal switch, and when the second transistor 22 is of the N-channel type it is able to represent an active load. The number of N-channel type transistors may vary from 1 to 12 in order to increase by a corresponding value the logarithmic conversion gain of the current photo-generated by the polarized diode 11. The pixel 10 is of the type able to detect light of a wavelength between 400 and 1000 nm and an intensity which varies in a range of at least 8 decades, between $10^{-5}$ and $10^3$ W/m², and is able to constitute the single cell of a multiple cell matrix sensor made entirely with CMOS technology and hence able to be integrated in a chip.

The diode 11 is made by a junction between an N-type insulated diffusion, medium doped, which can be achieved by means of Nwell, or strongly doped, achieved by means of an N+ diffusion, and the silicon substrate which is weak doped P. The interface area between the two parts of the diode is emptied of free charges and characterized by the presence of an internal electric field which can be increased by inversely polarizing the diode even from outside. To this purpose a ground contact has been put in the structure, to polarize the substrate and the N-type diffusion remains insulated or is connected to a positive voltage according to the state of the two transistors 21 and 22 which are driven externally through the signal lines 26 and 27.

The substrate P, which represents a common point for the N-channel transistors, weakly doped, is polarized to ground. The P-channel transistor is made inside a deep diffusion achieved by means of a Nwell. The latter is polarized to a voltage which, according to the embodiment, can be the feed tension or the tension of its source.

In the emptied zone, the light generates electron-hole pairs, which are separated from the electric field at the junction, giving origin to a current directly proportional to the incident light.

During the reset phase, the first P-channel transistor 21 is put in a conduction state by putting the signal 27 at a low voltage (preferably ground); in this way the photosensitive node 25 is polarized to the external voltage.

During the integration phase the signal 27 is taken to a high voltage so that the first transistor 21 is switched off.

The signal 26 is put at a fixed voltage between a minimum and a maximum. The minimum value is represented by a voltage equal to the threshold tension of the transistor; this guarantees that the so-called "blooming" effect is excluded. The maximum value is represented by the supply voltage or, in extreme cases, by an external superfeed.

By varying this voltage we will also vary the range of illumination in which the pixel behaves in a linear mode with respect to that in which it behaves in logarithmic mode.

Let us consider the two extreme cases:

if the voltage is fixed at the minimum value expected, we shall have a completely linear behavior;

if the voltage applied through the line 27 is the maximum, the behavior will be only logarithmic. In fact, in this case, the second transistor 22 will be forced to work in a so-called sub-threshold region and it imposes a logarithmic type relation between the voltage at the photo-sensitive node 25 and the photo-generated current.

The diode 11 occupies about 40% of the total surface of the pixel 10, and has a good conversion efficiency throughout the whole spectrum of the visible and nearby infra-red light. In fact, as a result of the characteristics of the photo-diode, particularly the depth of the junction and the level of doping of the Nwell diffusion and the substrate P, the pixel 10 is sensitive to radiations in the nearby infra-red, between about 800 and about 1000 nm, because this radiation is composed of photons of energy suitable to penetrate the silicon and reach the emptied area of the photo-diode and there generates pairs of electric charges.

The amplification and reading circuit 20 substantially consists of a third transistor 23 and a fourth transistor 24, each of which has its own specific function.

The transistor 23, made according to the known configuration called common drain or source follower, achieves the first stage of voltage amplification of the signal, transferring the voltage present on the photo-sensitive node 25 to the drain of the fourth transistor 24, with a gain in voltage near to one; enabling the fourth transistor 24 allows to connect the pixel 10 with an output line 28 (called bitline) with the advantage of transferring the voltage of the photo-sensitive node 25 to the bitline without losses, something which would not be possible in the absence of the amplification transistor 23.

The pixels 10 made in this way are organized in a two-dimensional matrix for the vision of complete scenes, but every sub-windowing of the matrix into subsets is possible.

Figure 2:
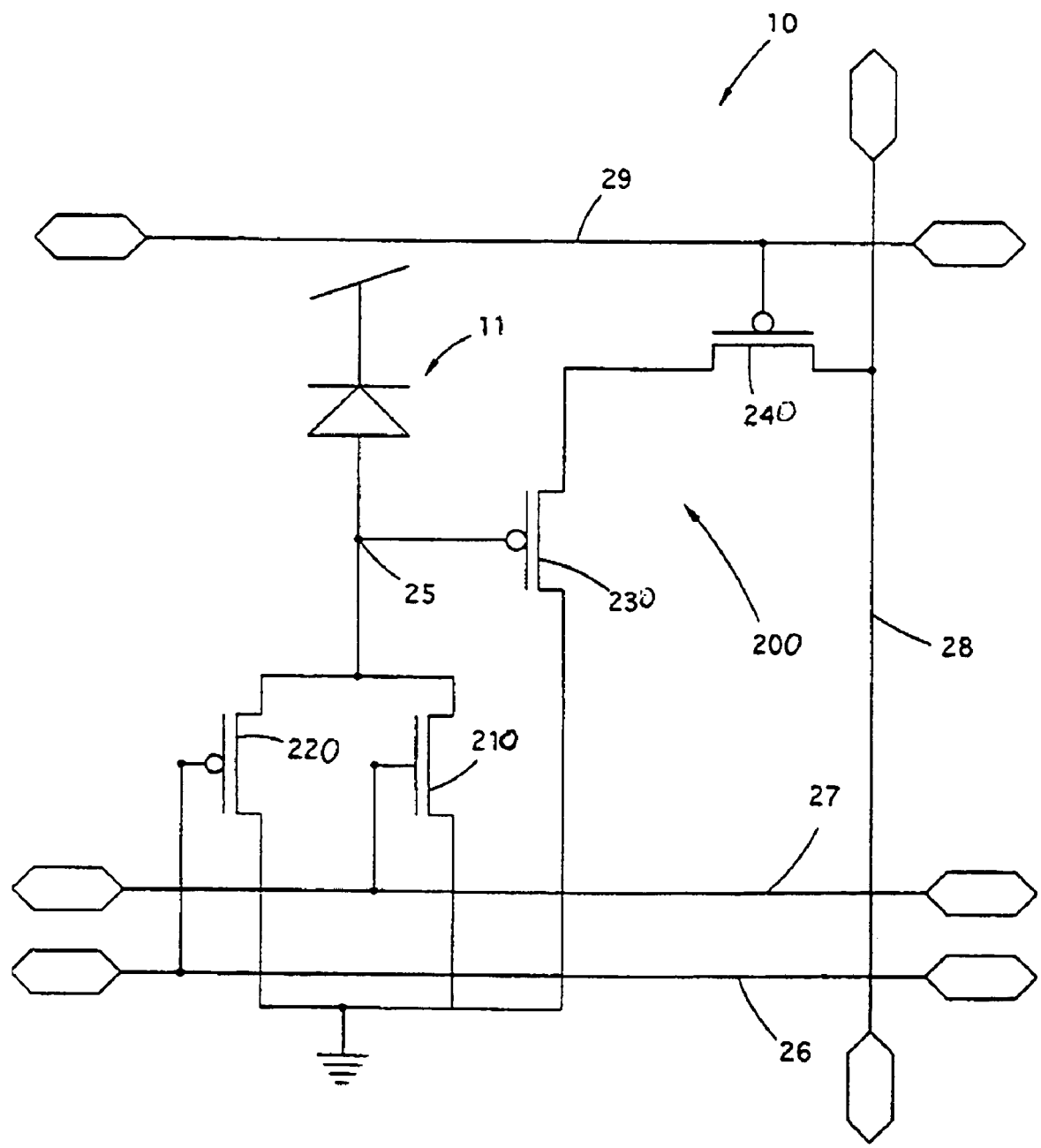

A second configuration of the pixel, disclosed in FIG. 2, is possible. In this second configuration, the polarity of the diode is inverted, all the N-channel type transistors (such as 22, shown in FIG. 1) are replaced by P-channel type transistors (such as 220, shown in FIG. 2), the P-channel type transistor 21 (shown in FIG. 1) is replaced by an N-channel type transistor 210 (shown in FIG. 2), while the third and fourth transistors 230,240 (of amplification and reading circuit 200) are of the P-channel type. The positive feed terminals and the mass are inverted. This configuration has a very similar functioning to that of the configuration described above.

In order to be able to read a matrix, we have to wait a certain time needed for integration; this is in the range of some microseconds. The integration time is another factor that affects the type of signal received, linear or logarithmic: for short times we will mainly have linear responses, while for longer times the response in most cases will be logarithmic.

Thanks to the fact that the signal is detected at two different moments, it is performed in hardware mode, by means of subtraction of the two signals, the correction of the reading noise, both in linear and logarithmic mode. This correction is possible thanks to the presence of the P-channel transistor 210 which functions as an ideal switch and allows to eliminate the "settling time" error which occurs if only N-channel transistors are used. The "settling time" error is due to the fact that the N-channel transistor uses a certain time before taking the pixel from the value immediately after transition, which depends on the value from which it starts, to the final reset voltage; this time is typically more than the reset time. This causes a certain uncertainty on the value obtained after subtraction of the reset signal and the integration signal, and hence additional noise. Moreover, due to the fact that the N transistor does not behave ideally, the final reset value depends in any case in logarithmic mode on the light present.

Alternatively the pixel can be used as a purely logarithmic pixel; in this case, the current is continually transformed into voltage and the signal can be read at any moment whatsoever, with a frequency of reading which can even reach 20 MHz, identifying any pixel 10 in the matrix. In order to read, it is sufficient to enable the fourth transistor 24, by means of a signal carried through the selection line 29, and to connect the corresponding output line 28 to a global line, which takes the signal to an amplifier and subsequently to an analogical-digital converter, which are not shown in the drawing.

If the pixel is used in its original configuration, it is also necessary to introduce an amplification stage on the level of the columns of the pixel matrix which makes a subtraction of the reset signal and the integration signal and a first amplification; this component is not shown in the drawing either.

A standard CMOS type technology can be used to make the sensor, that is, a process to make the microelectronic circuits in silicon, in order to obtain photo-sensitive elements with satisfactory electro-optical characteristics without having to develop a dedicated technology.

The invention claimed is:

1. Photo-sensitive element for electro-optical sensors, comprising at least:
   a photo-sensitive reception means,
   a current conversion circuit to convert the current generated by said photo-sensitive reception means into a voltage signal at a photosensitive node, and
   an amplification and reading circuit,
   wherein said current conversion circuit comprises at least a P-channel first transistor for operating as an ideal switch and driven by a voltage which is variable between a high voltage and a low voltage, said photo-sensitive element being able to be taken to a reset state if the driving voltage of said transistor is low, and to an integration state if said driving voltage is high,
   wherein said current conversion circuit comprises at least two transistors having opposite channel polarities to provide both linear conversion and logarithmic conversion capability, wherein said at least two transistors comprising said first P-channel transistor and at least a second N-channel transistor, said first and second transistors having one between their source or drain terminal in common with each other and connected to said photosensitive node and their gate terminals drivable externally by means of a voltage of a variable value to selectively allow either a linear conversion or a logarithmic conversion of said current photo-generated by said reception means, and
   wherein said second N-channel transistor is able to represent an active load.

2. Photo-sensitive element as in claim 1, wherein the number of second N-channel transistors is variable from 1 to 12, in order to increase by a corresponding factor the logarithmic conversion gain of said current photo-generated by said photo-sensitive reception means.

3. Photo-sensitive element as in claim 1, wherein said amplification and reading circuit comprises at least a third transistor suitable to make a first amplification of the signal and a fourth transistor to connect the photo-sensitive element to a signal transmission line.

4. Photo-sensitive element as in claim 3, wherein said photo-sensitive reception means consists of an inversely polarized N-type diode,
   the third and the fourth transistors are N-channel transistors.

5. Photo-sensitive element as in claim 3, wherein said photo-sensitive reception means comprises an inversely polarized N-type diode, the second, the third and the fourth transistors are N-channel transistors and the first transistor is a P-channel transistor.

6. Photo-sensitive element as in claim 1, wherein the photo sensitive element is able to detect the light of a wavelength of between 400 and 1000 nm and an intensity varying in a range of at least 8 decades, between $10^{-5}$ and $10^3$ W/m².

7. Photo-sensitive element as in claim 1, wherein the photo sensitive element it is able to be entirely integratable into a silicon substrate of limited size, to achieve a microchip.

8. Photo-sensitive element as in claim 1, wherein the photo sensitive element is able to constitute a cell of a linear or matrix multiple cell sensor.

9. Photo-sensitive element as in claim 1, wherein the photo sensitive element is able to be entirely integrated into a silicon substrate of limited size, to achieve a microchip.

10. Photo-sensitive element as in claim 1, wherein the photo sensitive element is able to constitute a cell of a linear or matrix multiple cell sensor.

11. Photo-sensitive element for electro-optical sensors, comprising at least:
    a photo-sensitive reception means,
    a current conversion circuit to convert the current generated by said photo-sensitive reception means into a voltage signal at a photo-sensitive reception means into a voltage signal at a photosensitive node, and
    an amplification and reading circuit,
    wherein said current conversion circuit comprises at least two transistors having opposite channel polarities, said at least two transistors comprising a first transistor and a second transistor, said first transistor comprising an N-channel first transistor for operating as an ideal switch and drivable by a voltage which is variable between a high voltage and a low voltage, said photo-sensitive element being able to be taken to a reset state if the driving voltage of said first transistor is high, and to an integration state if said driving voltage is low, said second transistor comprising a P-channel second transistor to provide in conjunction with said N-channel first transistor both linear conversion and logarithmic conversion capability,
    said first and second transistors having one between the respective source or drain terminal in common with each other and connected to said photosensitive node, and their gate terminals able to be driven externally by means of a voltage of a variable value to selectively allow either a linear conversion or a logarithmic conversion of said current photo-generated by said reception means, wherein said second P-channel transistor is able to represent an active load.

12. Photo-sensitive element as in claim 11, wherein said fourth transistor is able to be selectively enabled to allow the signal relating to the photo-sensitive element selected to be read at any moment whatsoever.

13. Photo-sensitive element as in claim 11, wherein said amplification and reading circuit comprises at least a third transistor suitable to make a first amplification of the signal and a fourth transistor to connect the photo-sensitive element to a signal transmission line.

14. Photo-sensitive element as in claim 13, wherein said photo-sensitive reception means comprises an inversely polarized P-type diode, and the third and the fourth transistors are P-channel transistors.

* * * * *